United States Patent

Fridenberg et al.

[11] Patent Number: 6,013,875
[45] Date of Patent: Jan. 11, 2000

[54] TRANSITIONAL SLEEVING FOR COAXIAL CABLE

[76] Inventors: Stephen J. Fridenberg; Mario B Hernandez, both of 14340 Bolsa Chica Rd., Suite K, Westminster, Calif. 92683

[21] Appl. No.: 09/129,457

[22] Filed: Aug. 4, 1998

[51] Int. Cl.[7] .............................. H02G 3/04; H02G 3/00; H02G 3/22
[52] U.S. Cl. ...................... 174/68.3; 174/68.1; 174/135; 174/65 R
[58] Field of Search .................................. 174/68.3, 68.1, 174/135, 136, 65 R, 72 C

[56] References Cited

U.S. PATENT DOCUMENTS

| | | |
|---|---|---|
| D. 285,044 | 8/1986 | Mockett . |
| D. 361,711 | 8/1995 | Plumley . |
| 2,188,596 | 1/1940 | Hobet . |
| 3,584,888 | 6/1971 | Lott et al. . |
| 4,125,238 | 11/1978 | Tanaka . |
| 4,451,108 | 5/1984 | Skidmore . |
| 4,688,491 | 8/1987 | Herrera et al. . |
| 4,911,510 | 3/1990 | Jenkins ................................ 350/96.1 |
| 5,114,365 | 5/1992 | Thompson et al. . |
| 5,144,777 | 9/1992 | Fishel et al. . |
| 5,167,047 | 12/1992 | Plumley . |
| 5,337,447 | 8/1994 | Tanaka et al. . |
| 5,473,723 | 12/1995 | Stockman et al. .................. 385/134 |
| 5,530,787 | 6/1996 | Arnett .................................. 385/137 |
| 5,686,700 | 11/1997 | Carpinella . |
| 5,828,807 | 10/1998 | Tucker et al. ...................... 385/135 |
| 5,929,380 | 7/1999 | Carlson, Jr. et al. ............... 174/68.3 |

*Primary Examiner*—Kristine Kincaid
*Assistant Examiner*—Mark Olds
*Attorney, Agent, or Firm*—James G. O'Neill

[57] ABSTRACT

Transitional sleeving for use with coax cable being inserted into an opening to prevent bending or flexing of the cable too sharply, includes an elongated, hollow sleeve, having reverse bend segments with strengthening ribbing attached to one side of the reverse bend segments. The sleeving may be provided with a collar at the end adjacent the opening into which the coax cable is to be inserted to hold the sleeving in position in the opening.

16 Claims, 2 Drawing Sheets

TRANSITIONAL SLEEVING FOR COAXIAL CABLE

BACKGROUND OF THE INVENTION

1. Field of the Invention

This invention relates generally to coaxial cable devices, and, more particularly, to transitional sleeving to prevent kinking in coaxial cable.

2. Description of Related Art

It is well known that if most cables and/or wires are bent at too sharp of an angle, stresses will be induced in the cable or wire, which might eventually cause the cable or wire to break, or which will interfere with the performance of the cable. In particular, coaxial (or "coax") cable used to bring in electrical signals, for example, for use in a computer, television set, or other electronic device, if crimped or bent at too sharp of an angle can interfere with, and even block, any electronic signals traveling therethrough. Because of this potential to interfere with the signals, the manufacturer's of such cable recommend that they be installed with no greater bend than a radius of about ten times the diameter of the cable, since the flexing of such cable more sharply tends to cause the degradation of both electrical and mechanical characteristics. Bends near the cable terminations, e.g. near the points of terminations with coax plugs, tend to be especially destructive.

Therefore, it is known to use coax couplers, such as disclosed in U.S. Pat. No. 4,451,108, fitted to the ends of a coax cable, and utilizing coax plugs to help prevent over bending. These coax couplers and plugs, however, tend to be expensive, and are hard to install in cramped places.

Other known devices, such as set forth in U.S. Pat. No. 4,125,238 to Tanaka disclose a right angle strain relief grommet or cord holder having a cylindrical member with a circumferentially disposed flange provided intermediate the axial extremities thereof, and resilient engaging projections disposed at a distance from the flange, equalling the thickness of an aperture panel, for accepting the cord holder and a lid member integrally connected with the grommet member by a hinge piece to enable the lid to be clamped over a cord inserted therethrough and hold the cord in place while bent at 90°. This type of device, however, could not be used with coax cable because of the limited space therein, and the inability for a gradual termination to be accomplished.

Therefore, there exists a need in the art for a simple-to-use and inexpensive device, such as the transitional sleeving for coax cable of the present invention, which easily slips over a cable and prevents the cable from being bent at too great an angle when being turned at 90°, as, for example, when entering or exiting a wall.

SUMMARY OF THE INVENTION

It is, therefore, a general object of the present invention to provide an improved member for bending coax cable. It is a particular object of the present invention to provide improved transitional sleeving for use with coax cable. It is another particular object of the present invention to provide improved transitional sleeving for use with coax cable inserted in walls. And, it is yet another particular object of the present invention to provide improved transitional sleeving for use with coax cable inserted into a wall, or the like, having strengthening means incorporated therein.

These and other objects and advantages of the present invention are achieved by providing an elongated, hollow sleeve which contains reverse bend portions, having strengthening ribbing incorporated therein, so as to control the bending of coax cable before it enters or after it leaves an opening.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

Figure 1:
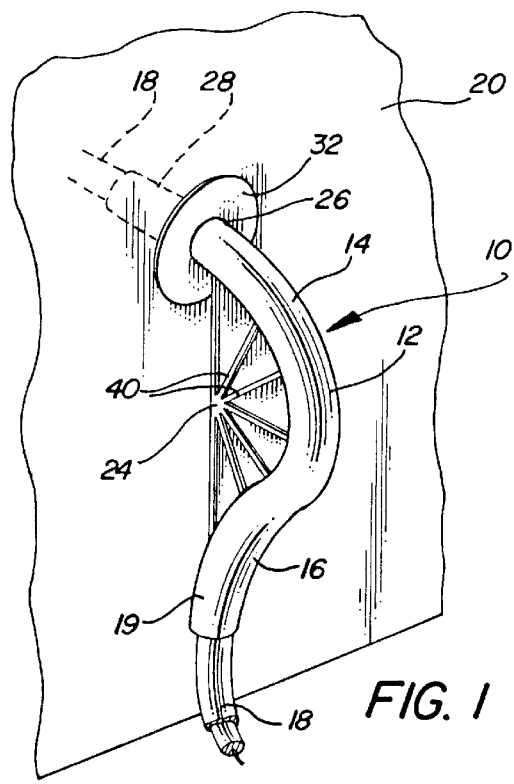
FIG. 1 is a perspective view showing a preferred embodiment of transitional sleeving of the present invention, for use with coax cable entering or exiting an exterior wall of a building.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to describe improved transitional sleeving for use in preventing coax cable from being bent at too great an angle when entering into or exiting an opening in a wall, or the like.

Turning now to the drawings, there shown is a preferred embodiment of transitional sleeving of the present invention, generally indicated at 10. The transitional sleeving 10 is preferably comprised of an elongated, hollow, serpentine-shaped sleeve or tube 12, having first and second bend sections 14, 16, preferably made from a moldable or extrudable material, such as plastic. In one preferred embodiment of the present invention, the sleeve or tube 12 has a length of approximately 4.25 inches, an outside diameter of about 0.415 inches, an internal or inner diameter of 0.374 inches and the two reverse bend sections or segments 14, 16, are sized and dimensioned to enable coax cable to enter and exit the sleeving bent at 90°. For example, section 14 may have a radius of approximately 1.30 inches, and 16 may have a radius of approximately 3.05 inches so as to gradually allow coax cable 18 inserted therein, and threaded through the tube to be bent at 90°, while preventing the coax from being kinked or bent beyond manufacturer's specifications when passing through a wall, such as an exterior wall 20, or an interior wall 22. To further maintain the integrity of the elongated, hollow, serpentine tubing 12, and, in particular, to maintain the shape of first and second curved segments 14, 16 a stiffening or strengthening means 24, such as internal ribbing, or inside bend ribbing, is integrally formed or somehow bonded or secured to the tubing 12 so as to extend over substantially the entire internal radius of bend section 14, and into bend section 16.

Figure 2:
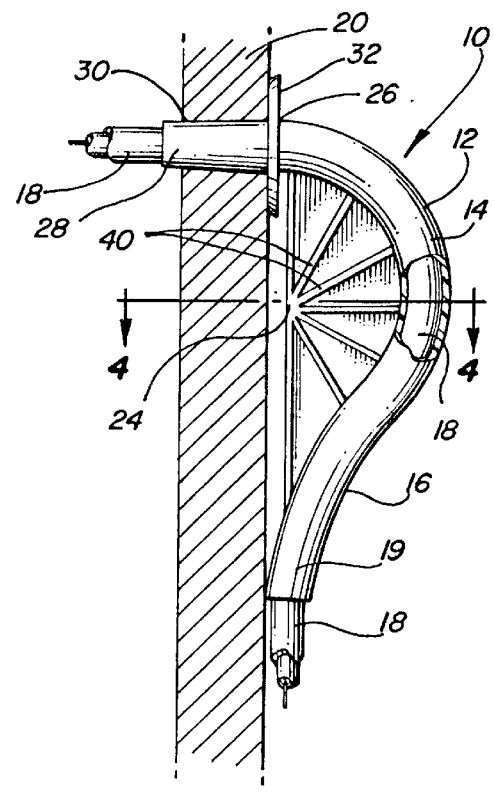
FIG. 2 is a side elevational view, partly in cross section, of the exterior wall and the transitional sleeving of FIG. 1.
Figure 5:
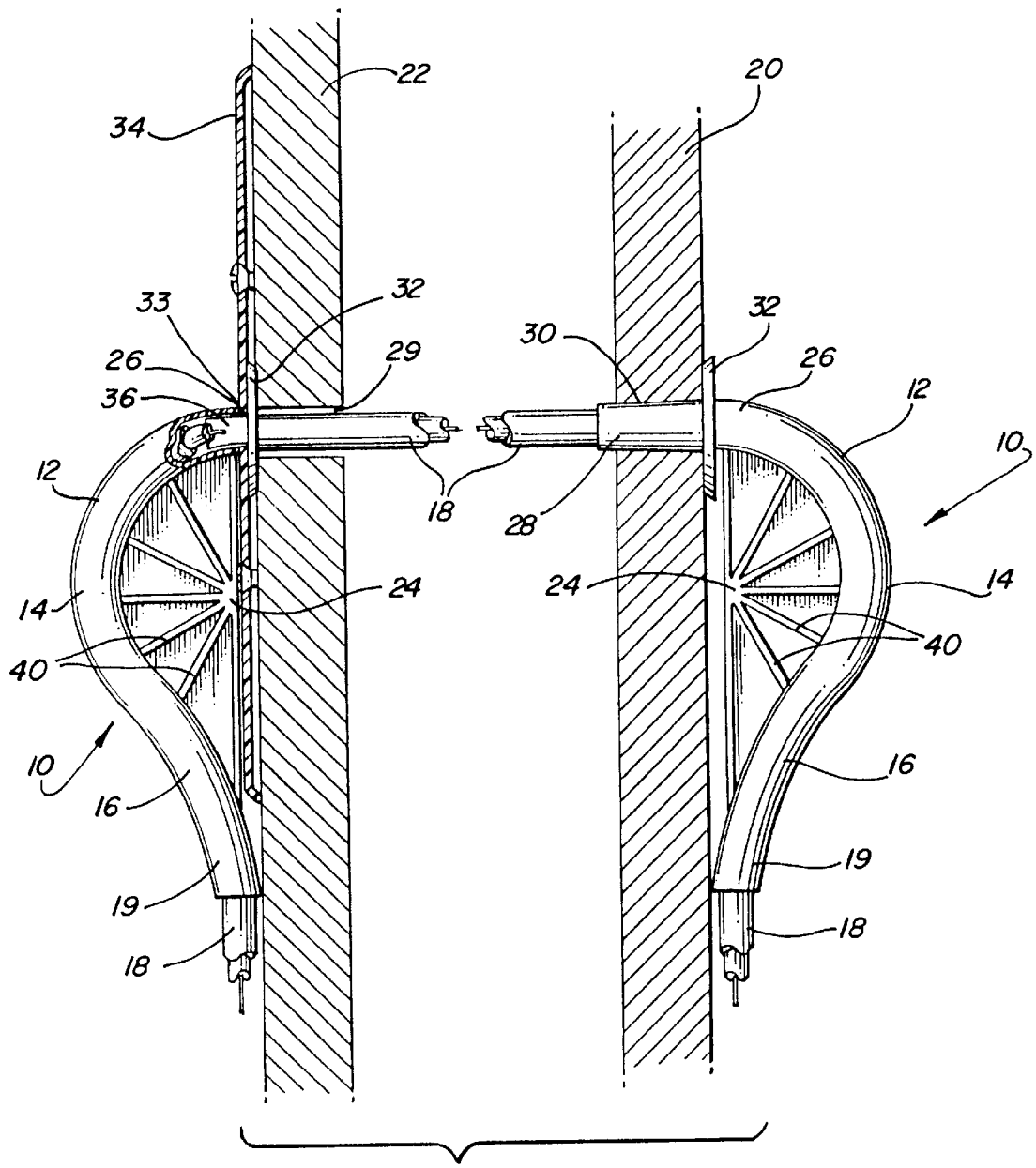
FIG. 5 is a side elevational view of a wall showing the interior and exterior walls of a building, with coax cable threaded through the transitional sleeving, inserted and held in an opening in the exterior wall and passing through an aligned opening in the interior wall, through a wall plate, and then through transitional sleeving held in the wall plate.

As shown in FIGS. 1, 2 and 5, when coax cable 18, generally parallel to exterior wall 20, enters the hollow tubing 18 at a first end 19, it is first bent outwardly by second bend segment 16, away from wall 20 and then gradually bent at 90° to the end 19, by bend segment 14, toward the wall 20, where it exits at end 26. The cable 18 then passes through an opening, such as 30, formed through exterior wall 20.

The second end 26 of the sleeving 10 is provided with a collar 32, or the like, having a washer which may be secured to end 26 to cover opening 30. A further portion of collar 32 (not shown), or a flexible sealing plug 28 is held on cable 18 to sealingly hold the sleeve 10 and coaxial cable 18 in position in opening 30. The sealing plug 28 may be separately inserted on the cable 18, or may be bonded, or otherwise fixed, to a side of the collar 32 held against the outside surface of the exterior wall 20, as by means of an annular member (not shown) secured to the collar.

Figure 3:
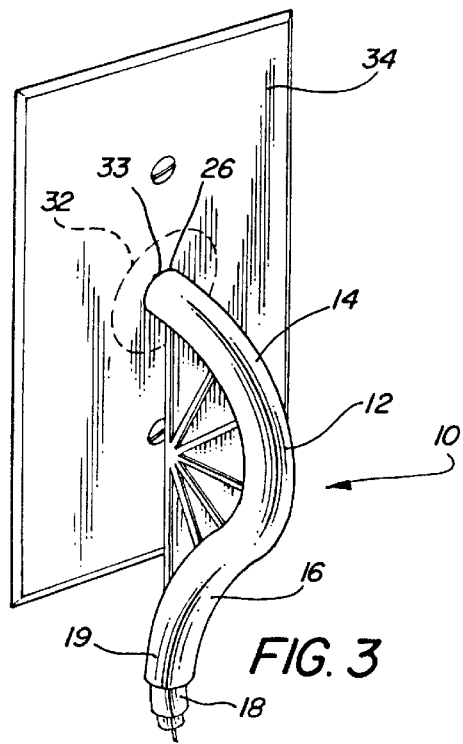
FIG. 3 is a further perspective view of a preferred embodiment of the transitional sleeving of the present invention inserted in a wall plate held on an interior wall.
Figure 4:
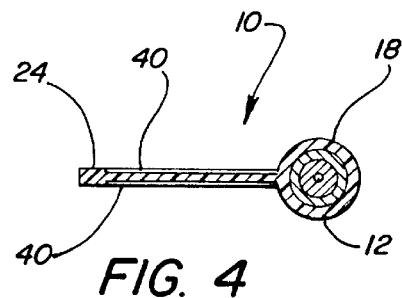
FIG. 4 is a cross sectional view taken along line 4—4 of FIG. 2.

As shown more clearly in FIGS. 3 and 5, the transitional sleeving 10 of the present invention, when used for coax cable entering or exiting an opening in an internal wall 22, includes the same elements, including the sleeving 12, with first and second curved sections 14, 16, a bend strengthening or ribbing element 24, and first and second ends 19, 26. Coax cable 18 is threaded through the sleeving 12, as for example, passing through an opening 29 in wall 22 into end 26 to exit at end 19, where it may be connected to a computer, TV, or the like. However, instead of having the collar 32 secured at end 26, the end 26 is rotatably secured within an opening 33 in a wall plate 34, or the like. The end 26 of the sleeving 10 is inserted through and held in the opening 33 and wall plate 34 by means of an annular portion 36 formed integrally with or secured to the collar 32. The annular portion 36 of collar 32 is inserted through opening 33 from the opposite or interior face of the wall plate 34 into the end of sleeving or tubing 12. The annular member 36 and collar 32 may be bonded or glued into the hollow interior of the sleeving 12, around the coax cable 18 so as to hold the transitional sleeving 10 in place, but allow rotation of the transitional sleeving 10 with respect to the wall plate 34.

The bend ribbing 24 is preferably approximately 1/16" thick, but may include a plurality of strengthening members or ribs 40 on either or both sides thereof, of greater thickness.

Thus, there has been described an improved, easy-to-use transitional sleeving for use when inserting coax cable into a wall, or other opening. The transitional sleeving may be used either on the inside or outside wall of a dwelling, office cubicles, or other building or enclosure, to hold coax cable inserted therein in the correct position so as to prevent the cable from being kinked or otherwise bent at too great an angle when entering or exiting an opening. The transitional sleeving includes strengthening means, such as bend ribbing, made from the same plastic or other material from which the transitional sleeving is manufactured, and may be molded with, or added to the sleeving. An enlarged collar or substantially circular, washer-type device secured to a flexible sealing plug or annular portion is used to aid in holding and sealing the transitional sleeving in an opening.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. Transitional sleeving for coax cable, comprising, in combination:

an elongated, hollow sleeve; the elongated, hollow sleeve being provided with reverse bend segments to enable coax cable to be threaded therethrough and turned 90°, from an entry to an exit, without impairing the function of the coax cable; and a collar having an annular portion and an enlarged washer portion for securing the elongated, hollow sleeve in an opening.

2. The transitional sleeving of claim 1, further including strengthening means secured to a side of the elongated, hollow sleeve.

3. The transitional sleeving of claim 2 wherein the strengthening means is comprised of bend ribbing secured to the elongated, hollow sleeve between the reverse bend segments.

4. The transitional sleeving of claim 1 wherein the annular portion is flexible and inserted in an opening and the enlarged washer portion is secured to one end of the elongated, hollow sleeve.

5. The transitional sleeving of claim 1 wherein the annular portion is inserted into one end of the elongated, hollow sleeve, and the enlarged washer portion is secured against a surface of a wall plate.

6. The transitional sleeving of claim 1 wherein the reverse bend segments are curved at different radii so as to gradually bend coax cable threaded therethrough.

7. The transitional sleeving of claim 6 wherein a first bend segment has a radius of about 3.05 inches, and a second bend segment has a radius of about 1.30 inches.

8. The transitional sleeving of claim 7, further including bend ribbing to strengthen the elongated, hollow sleeve secured between the first bend segment and the second bend segment on one side of the elongated, hollow sleeve.

9. The transitional sleeving of claim 8 wherein the elongated, hollow sleeve is about 4.25 inches and the means for securing the elongated, hollow sleeve in an opening is a separate holding means.

10. The transitional sleeving of claim 9 wherein the annular portion is inserted into one end of the elongated, hollow sleeve, and the enlarged washer portion is secured against a plate having an opening formed therein, so as to rotatably hold the elongated, hollow sleeve in the opening in the plate.

11. The transitional sleeving of claim 9 wherein the annular portion is a hollow plug to which the enlarged washer portion is secured and the annular portion is flexible and is secured in an opening to hold the transitional sleeving in place.

12. Transitional sleeving for coax cable comprising, in combination:

an elongated, hollow tube having a first open end and a second open end; the elongated, hollow tube having reverse bend segments starting at the first open end and the second open end and meeting so as to form a serpentine shape;

strengthening ribbing secured to the elongated, hollow tube along a side thereof between the reverse bend segments; and a holding element comprised of a collar having an annular portion and an enlarged washer for securing the elongated, hollow tube and any coax cable threaded therethrough in an opening.

13. The transitional sleeving of claim 12 wherein the reverse bend segments are comprised of a first bend segment having a radius of approximately 3.05 inches and a second bend segment having a radius of approximately 1.30 inches, and the elongated tubing is about 4.25 inches long.

14. The transitional sleeving of claim 12 wherein the annular portion is inserted into the second open end of the elongated, hollow tube and the enlarged washer portion is secured against one side of a wall plate with the hollow plug passing through a hole in the wall plate, to allow rotation of the elongated, hollow tube with respect to the wall plate.

15. The transitional sleeving of clay 12 wherein the annular portion includes a flexible sealing plug, and the flexible sealing plug is adapted to be secured in an opening with the enlarged collar held against the opening.

16. Transitional sleeving for coax cable comprising, in combination:

an elongated, hollow tube having a first open end and a second open end; the elongated, hollow tube having reverse bend segments starting at the first open end and the second open end so as to form a serpentine shape;

the reverse bend segments are comprised of a first bend segment having a radius of approximately 3.05 inches and a second bend segment having a radius of approximately 1.30 inches, and the elongated, hollow tubing is about 4.25 inches long;

strengthening ribbing secured to the elongated, hollow tube along a side thereof between the first bend segment and the second bend segment; and a holding element comprised of a collar having an enlarged washer and a flexible annular portion for holding the elongated, hollow tube and any coax cable threaded therethrough in an opening.

* * * * *